Figure 1:
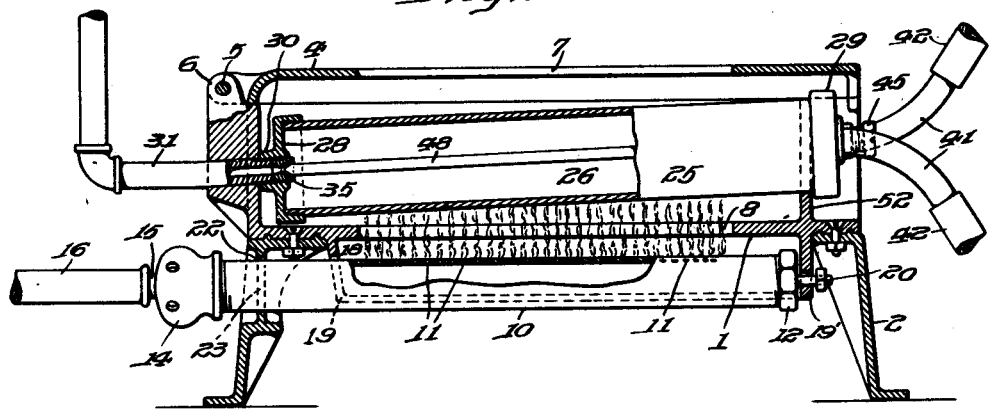

July 21, 1925.

S. R. M. ORUM

LIQUID HEATING DEVICE

Filed Dec. 28, 1920

1,546,746

INVENTOR

Samuel R.M. Orum.

WITNESS

BY

ATTORNEYS

Patented July 21, 1925.

1,546,746

UNITED STATES PATENT OFFICE.

SAMUEL R. M. ORUM, OF PHILADELPHIA, PENNSYLVANIA.

LIQUID-HEATING DEVICE.

Application filed December 28, 1920. Serial No. 433,592.

*To all whom it may concern:*

Be it known that I, SAMUEL R. M. ORUM, a citizen of the United States, and a resident of the city of Philadelphia, county of Philadelphia, and State of Pennsylvania, have invented certain new and useful Improvements in Liquid-Heating Devices, of which the following is a specification, reference being had to the accompanying drawing.
A principal object of my invention is to provide a small, portable apparatus adapted to supply steam or heated fluid in substantially constant quantity and at substantially constant temperature which may be operated at substantially atmospheric pressure, thereby avoiding the numerous difficulties and frequent danger involved in the use of small steam generators in which the internal pressure is greater than atmospheric.
Further objects of my invention are the provision of means in a steam generator or fluid heater for automatically regulating the flow of liquid in correspondence with the degree of heat employed, so that variations in the latter will be compensated for and the temperature of fluid or vapor delivered from the device maintained substantially constant once the regulating means has been manually adjusted to conform to desired conditions.
My invention further comprehends the provision of a device embodying the foregoing characteristics which is simple in construction, contains but a relatively small number of parts, is convenient in operation, not liable to get out of order or be damaged in use and which may be manufactured and marketed at relatively low cost.

The invention further includes all of the other various objects and novel features of construction and arrangement hereinafter more definitely specified and described.

It will be understood that devices of the character of that to which reference has been made may be employed in the arts for numerous purposes and under different conditions of operation where it is desired to furnish a relatively constant supply of steam or heated fluid safely, conveniently and economically, as, for example, in storage battery work, in which it is customary to soften the composition surrounding the battery covers preparatory to their removal by introducing hot steam to the interior of the battery. There are, however, numerous other uses than the example given, for which my invention is well adapted and for which it may be readily utilized if desired.

In the preferred embodiments of my invention, I take advantage of the unequal expansion of the different metals composing certain elements of the device in order to effect the automatic regulation to which reference has already been made, thereby bringing about a regulation of the flow of liquid to the device in correspondence with, and in nicely adjusted proportion to, the degree of heat under which the apparatus is operating, an increase in temperature effecting a corresponding increase in the flow of liquid and a decrease in temperature effecting a corresponding decrease therein.

Figure 2:
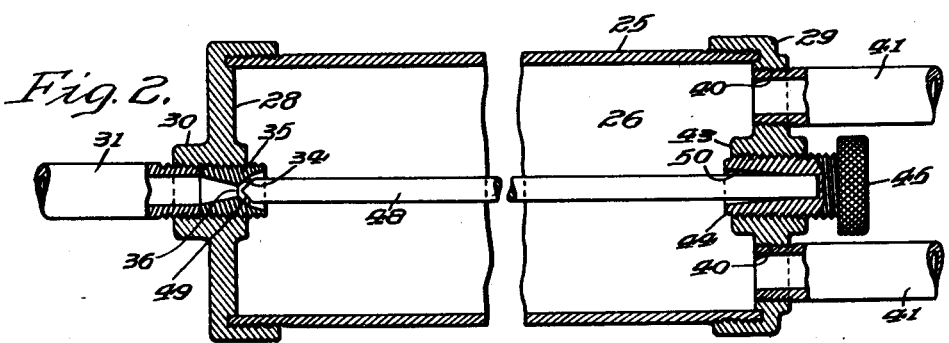
Figure 3:
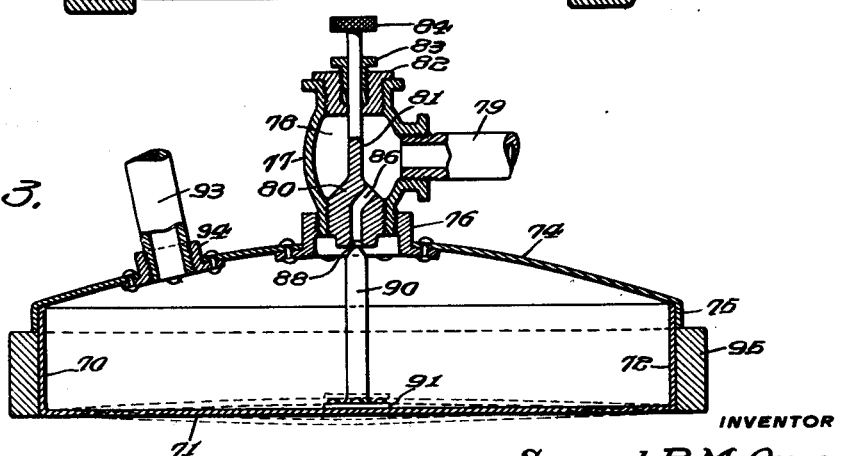

In the accompanying drawings I have illustrated certain embodiments of my invention, the form shown in Figs. 1 and 2 comprising a self-contained heating means, such, for example, as a suitable gas burner adapted for connection to a suitable source of gas supply, and the form shown in Fig. 3 and from which the self-contained burner is omitted, being more particularly intended to be placed upon a stove or adjacent an ordinary gas heating burner or other independent source of heat, to effect the heating or vaporization of the fluid passing through the device. In the said drawing Fig. 1 is a vertical central section, with certain parts shown in elevation of one form of the invention, and Fig. 2 is an enlarged fragmentary horizontal section, certain parts being shown in elevation, of the heating chamber and adjacent parts thereof. Fig. 3 is a vertical central section, with certain parts shown in elevation, of a modified form of the invention adapted, as already stated, to derive the necessary heat from an external source as distinguished from a self-contained burner.

Referring now more particularly to the form of the invention shown in Figs. 1 and 2, the same comprises an elongated housing 1 conveniently supported on suitable legs 2 preferably three in number bolted to the bottom of the housing, which is preferably open at its top. For the purpose of closing the open top of the housing a suitable cover 4 is provided and to enable convenient access to the interior of the housing, hinged on a transversely extending pivot 5 to a suitable lug 6 carried by the housing so that the cover may be raised when desired. The cover may be provided with a longitudinally extending central slot 7 to permit the escape of heat, and the bottom of the housing with a substantially corresponding slot 8 through which the heat generated in a burner 10 positioned beneath the housing may pass to the interior thereof. This burner may be of any suitable or desired construction, for example, and as shown, a tube provided with perforations 11 along its upper surface, closed at one end by a cap 12 and supplied at its other with a suitable air inlet 14 and a gas inlet 15, the latter being connected by a tube 16 with any suitable source of gas supply. The burner is suitably supported beneath the slot 8 in the housing in any convenient manner, and in order to confine the heat and direct it upwardly into the housing the latter is preferably provided on each side of the burner with an integral depending guard 18, the two guards being connected by transversely extending webs 19, 19', the former being suitably apertured for the passage of the burner and the latter conveniently serving as a support for a stem 20 formed on the cap 12 and extending through an aperture in the web, thereby supporting one end of the burner in proper position beneath the housing. The other end of the burner is conveniently supported by its passage through an aperture 22 formed in a web 23 extending transversely of the rear leg of the apparatus or in any other suitable way. The particular form and construction of the burner form no part of the present invention and the detailed arrangement of the means by which the burner is supported beneath the housing may be varied as desired as will be readily understood by those familiar with the art.

Suitably supported within the housing is positioned the means in which the heating or vaporization of the liquid introduced into the apparatus is effected, which means, for convenience, I shall hereinafter term the "boiler", and which may comprise a longitudinally extending pipe 25 formed of brass, copper or other material having a relatively high coefficient of expansion, the interior of this pipe forming the heating chamber 26. For closing the end of the pipe caps 28 and 29 are provided and preferably threaded or otherwise secured to the ends thereof. The cap 28 is preferably provided with a central boss 30, into the outer end of which is threaded the fluid supply pipe 31 connected with a suitable reservoir or the like (not shown) and which passes through the inner wall of the housing and serves to conveniently support the adjacent end of the boiler in position within the housing with the lower part of the cap preferably slightly out of contact with its base. Preferably at the center of the cap and on its inner side is provided a substantially conical valve seat 34 which may be formed either directly in the cap or preferably in a bushing 35 threaded or otherwise secured in the cap or boss 30, this seat preferably having a considerable flare toward its mouth and being constricted at a considerable angle in the direction of the supply pipe to provide a relatively small opening 36 for the passage of the liquid in the pipe to the interior of the boiler surrounded by a rather widely flaring surface forming the seat proper.

The cap 29 which serves to close the opposite end of the boiler is provided with one or more apertures 40 into which may be threaded or otherwise secured outlet pipes 41 through which the heated liquid or steam is conducted as by tubes 42 to the point at which it is desired to employ it, and also with a central apertured boss 43 into which is threaded the adjusting plug 44 conveniently provided with a milled head 45 to faciliate the operation of adjusting it longitudinally of the cap.

Extending from the plug 44 to a point adjacent the seat 34 is a valve rod 48 which is preferably formed of steel, iron or other material having a relatively low coefficient of expansion, the rear end of the rod being suitably beveled and finished as at 49 in correspondence with the form of the valve seat 34 so as to accurately cooperate therewith and the opposite end preferably seating somewhat loosely in a slightly conical aperture 50 formed centrally of the adjusting plug and of greatest diameter near its mouth. While in certain constructions other means than those described may be employed for mounting the rod in the plug, it is preferred to utilize a somewhat loose connection between these parts, as in the absence thereof difficulty may be experienced in causing the rod to seat properly on the valve seat 34, since a slight disalignment of the rod or eccentricity in its mounting in the plug so that the rod, plug and valve seat are not perfectly coaxial would tend, upon longitudinal adjustment of the plug in the cap, to throw the rod and its seat out of alignment and thus interfere to some extent with the proper functioning of the apparatus.

The end of the boiler adjacent the cap 29 may be supported in any convenient way within the housing, as, for example, by a transversely extending apertured web 52 which serves also to close the end of the housing and prevent the escape of heat therefrom, the arrangement of the parts being such that the boiler is preferably slightly inclined upwardly from its rear end adjacent cap 28 to its opposite end, as clearly shown in Fig. 1.

In the operation of that form of the apparatus which has just been described, the flow of liquid from the supply pipe to the interior of the boiler is initially controlled and regulated by longitudinal adjustment of the adjusting plug 45, the preferred adjustment when the apparatus is being utilized for the production of steam being such that only so much water is admitted as can be almost immediately vaporized through the heat supplied by the burner, the apparatus thus operating in the nature of a "flash boiler". This adjustment having been attained, as typically indicated by the position of the rod shown in full lines in Fig. 2, so long as operative conditions remain constant the steam will be supplied in a substantially constant volume, to be conducted from the apparatus to its point of application through the pipes 41 and tubes 42. If, however, owing to a change of pressure in the fluid supply pipe 31 or some other similar condition, an excess amount of water begins to pass into the boiler, or if, owing to diminution of pressure or the like in the supply of gas, the temperature of the flame beneath the boiler is lowered, the latter will contract longitudinally and more rapidly, owing to its greater coefficient of expansion, than the rod 48, thus moving the valve seat 34 toward the rod and effecting a decrease in the area of the opening through which the liquid passes to the boiler and consequent diminution of the liquid supply. Conversely, in case of a decrease in the normal flow of liquid from the supply pipe, or an increase in the amount of heat supplied the exterior of the boiler, the latter will expand longitudinally more rapidly than the rod 48 and thus move the seat 34 away from the adjacent end of the rod, thereby increasing the flow of liquid into the boiler so long as the operating conditions are abnormal. It will thus be evident that by taking advantage of the relative difference in expansion between the boiler and the rod, an automatic regulation of the flow of liquid to the boiler is effected and variations in the normal and desired temperature of the steam or heated liquid passing from the apparatus which might arise from changes in operating conditions are materially reduced.

In the slightly modified form of the invention shown in Fig. 3, a preferably circular boiler 70 is employed which may be drawn from brass, copper or other suitable material having a relatively high coefficient of expansion in the form of a shallow cup comprising a bottom 71 and a peripheral vertical side wall 72, the cup being closed at the top by a preferably upwardly curved cover 74 having a depending flange 75 forced over and secured to the free edge of the side wall. Preferably at the center of the cover is riveted or otherwise secured an upwardly extending bushing or nipple 76 which serves to support a substantially T-shaped member 77 threaded into the nipple and affording a hollow central chamber 78. Into a suitable boss formed in the member 77 is threaded a liquid supply pipe 79 through which the liquid to be heated or vaporized is introduced into the chamber 78, and suitable preferably manually adjustable means are provided for regulating the amount of said fluid which shall normally pass to the interior of the boiler. In the form of the invention shown, said means comprise a control member having an enlarged lower extremity 80 which is threaded into the lower end of the member 77 so as to be vertically adjustable therein through the medium of the stem 81 which extends upwardly through a stuffing box 82 and gland 83 positioned in the upper part of the member and terminates in a milled head 84 adapted for convenient manual manipulation. A bore 86 is formed through the enlarged portion 80 of the control member and communicates at its upper extremity with the chamber 78 and at its lower, with a valve seat 88 formed in the lower face of the member and adapted for coaction with the correspondingly beveled and finished end of a vertical valve rod 90 which extends upwardly from the bottom of the boiler to a point adjacent the seat, the lower end of the rod being preferably provided with a flange 91 which is riveted or otherwise secured to the bottom of the boiler. This rod, like the rod 48 already described in connection with the form of the invention shown in Figs. 1 and 2, is preferably formed of material, such as steel or cast iron, having a lower coefficient of expansion than the material of which the boiler is made. The boiler may be provided with an outlet pipe 93 conveniently threaded into a bushing 94 positioned in the top of the boiler by means of which heated fluid or vapor may be conveyed from the boiler.

It will be understood that an apparatus of this type is intended to be placed on a stove, hot plate, gas burner or the like with the bottom of the boiler adjacent such source of heat, and that in order to effect the automatic regulation of the flow of liquid to the boiler from the chamber 78 by means of the unequal expansion of the rod 90 and the material of which the boiler is formed in the manner already described, it is necessary to provide means for properly directing the expansion and contraction of the boiler so as to effect the requisite movement of the rod, said means in the form of the invention shown, comprising a relatively heavy ring 95 of cast iron or other suitable material preferably having a low coefficient of expansion which is closely positioned around the exterior of the boiler and suitably secured thereto, this ring being operative to cause the forces tending to expand and contract the boiler to be exerted to move the bottom thereof vertically as indicated in dotted lines in Fig. 3 and thus move the rod 90 toward or away from the seat 88 upon variations in temperature of the heating means or variations in the quantity of liquid entering the boiler and which result in temperature changes in the material of which the apparatus is composed. The slight pressure within the boiler is sufficient to dish the bottom slightly outward under normal conditions so that an increase of pressure will cause a further dishing of the bottom in that direction.

It is thought that the operation of this form of the invention will be readily understood without extended description, the desired normal adjustment being effected by raising or lowering the valve seat 88 through the medium of the milled head 84, after which any variations in the temperature of the heating means or in the water supply will be automatically compensated through the movement of the rod 90 toward or away from the valve seat in correspondence with the heating or cooling of the parts above or below normal operative conditions.

While I have herein described with considerable particularity certain preferred forms of my invention intended more particularly for the generation of steam at substantially atmospheric pressure, I do not thereby desire or intend to limit myself specifically thereto, as suitable changes and modifications may be made in the arrangement, form and construction of the various parts and the invention adapted for heating water or other fluids instead of for the generation of steam, without departing from the spirit and scope of the invention as defined in the appended claims.

Having thus described my invention, I claim and desire to protect by Letters Patent of the United States:

1. A device of the class described comprising a boiler formed of material having a relatively high coefficient of expansion, means for supplying a fluid to the interior of said boiler, a valve seat adjacent said source of fluid supply, a valve rod formed of material having a relatively low coefficient of expansion and cooperative with said seat to control the flow of liquid to the interior of said boiler, said rod being secured to a portion of said boiler removed from said seat and being movable therewith.

2. A device of the class described comprising a boiler formed of material having a relatively high coefficient of expansion, a valve seat within said boiler, means for supplying liquid to the interior of said boiler at a point adjacent said seat, a valve rod within said boiler formed of material having a relatively low coefficient of expansion and cooperative with said seat to regulate the supply of fluid to the interior of the boiler in correspondence with temperature changes of the several parts.

3. A device of the class described comprising a boiler formed of material having a relatively high coefficient of expansion, a valve seat within said boiler, means for manually effecting adjustment of said valve seat relative to said boiler, a valve rod within said boiler formed of material having a relatively low coefficient of expansion and cooperative with said seat to regulate the flow of fluid thereover independently of the manually adjusted position of said seat in correspondence with variations of temperature of the wall of said boiler.

4. A device of the class described comprising a boiler formed of material having a relatively high coefficient of expansion, a valve seat within said boiler, means for manually effecting adjustment of said seat with respect to the wall of the boiler, means for conducting fluid to said seat, a valve rod formed of material having a relatively low coefficient of expansion and carried by and freely movable with a portion of said boiler removed from said seat and cooperative with said seat to automatically control the flow of fluid thereover in correspondence with variations in temperature in the wall of said boiler.

In witness whereof, I have hereunto set my hand this 27th day of December, 1920.

SAMUEL R. M. ORUM.